Figure 1:
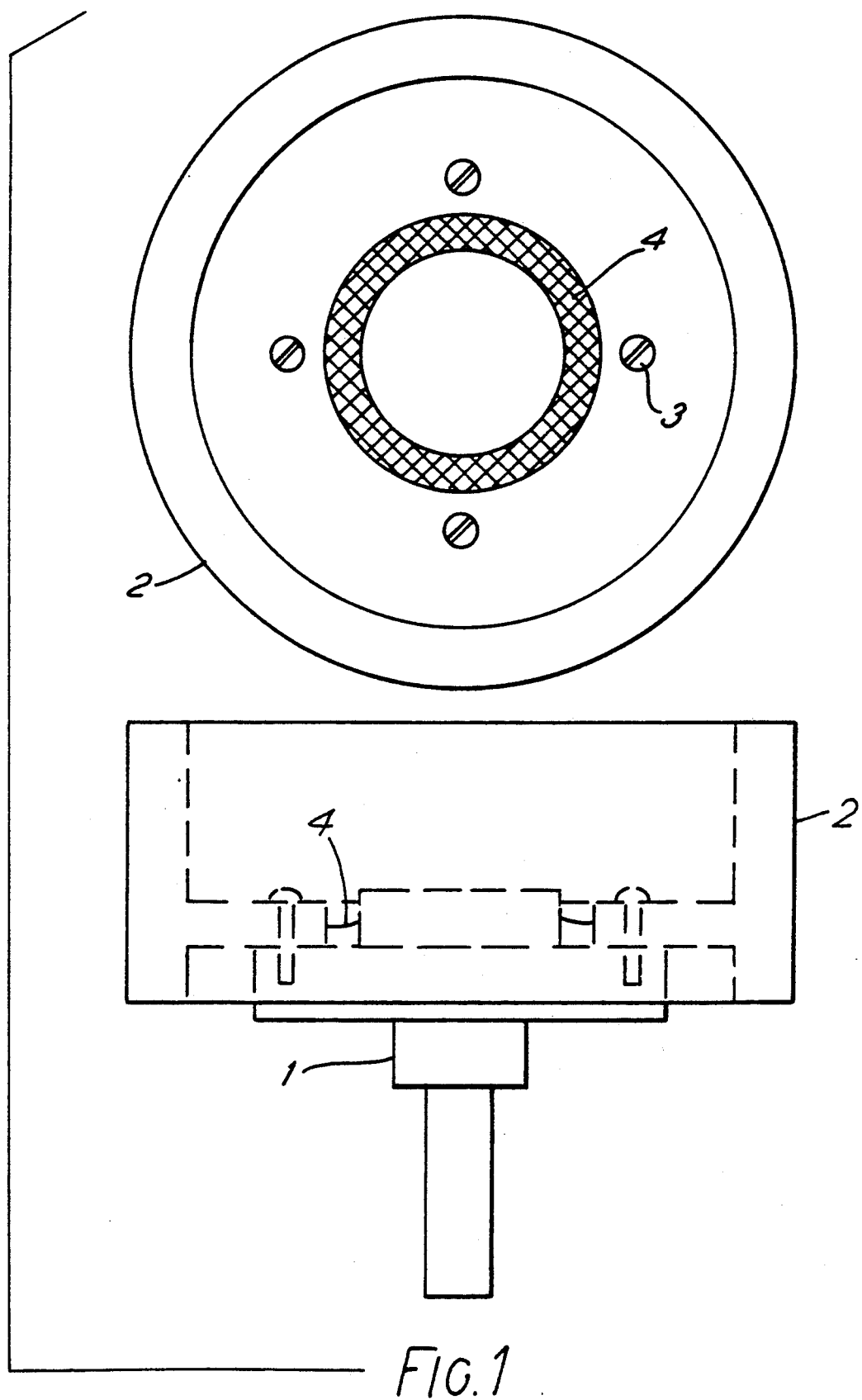

United States Patent [19]

Dean

[11] Patent Number: 5,042,956

[45] Date of Patent: Aug. 27, 1991

[54] RECORDING DRUM ASSEMBLIES

[75] Inventor: Terence F. Dean, Ruislip, England

[73] Assignee: Thorn EMI plc, London, England

[21] Appl. No.: 426,222

[22] Filed: Oct. 25, 1989

[30] Foreign Application Priority Data

Oct. 25, 1988 [GB] United Kingdom ............... 8824966

[51] Int. Cl.$^5$ .................... F16B 1/00; F16D 1/00
[52] U.S. Cl. .................... 403/24; 403/372; 403/261; 403/13
[58] Field of Search ............... 403/371, 372, 365, 261, 403/259, 258, 260, 24, 13; 355/200

[56] References Cited

U.S. PATENT DOCUMENTS 1,477,785 12/1923 Szukalski, Jr. ................ 403/365 X
3,367,687 2/1968 Jenkins ............................ 403/261

FOREIGN PATENT DOCUMENTS 272590 6/1927 United Kingdom ............... 403/359

*Primary Examiner*—Andrew V. Kundrat
*Attorney, Agent, or Firm*—Fleit, Jacobson, Cohn, Price, Holman & Stern

[57] ABSTRACT

A recording drum assembly comprises a cylindrical drive shaft 1, a drum 2, and an annular disc 4 of resilient material, such as spring steel, located between the drive shaft 1 and drum 2 and substantially coaxial with the drum 2. The disc 4, by elastic deformation when engaged by the drive shaft 1, provides axial alignment of the drum 2 and drive shaft 1. A portion of reduced diameter may be provided on the drive shaft 1 to facilitate removal of the drum 2 from the drive shaft. Furthermore, the annular disc 4 may be used to support the drum 2 during machining of the drum outer surface to ensure coaxial alignment.

9 Claims, 2 Drawing Sheets

RECORDING DRUM ASSEMBLIES

This invention relates to drums for use in recording systems, and especially, though not exclusively, to drums for use in helically scanned optical recording systems of the kind described in European published patent application No. 0263656.

In any helically-scanned recording system it is essential that the rotating components of the assembly have very little radial runout (typically in the order of 1 micron). This requirement may entail the careful selection of parts on assembly or involve comparatively lengthy setting-up and alignment procedures. In some cases the method chosen does not allow easy interchangeability or even disassembly and reassembly should servicing become necessary. This invention is concerned with a recording drum assembly that substantially alleviates the above-mentioned fabrication difficulties.

Accordingly there is provided a recording drum assembly comprising a drum member, a drive shaft, and an annular disc of resilient material arranged substantially coaxial with respect to the drum and having an axial bore for engagement by the drive shaft and arranged to provide substantial axial alignment of the drum member with the drive shaft.

Preferably, the annular disc comprises spring steel and the drive shaft includes a portion of reduced cross section for facilitating removal of the drum from the drive shaft.

The present invention also provides a method for fabricating a recording drum assembly, the method comprising securing an annular disc of resilient material to a drum member, supporting the drum member by way of the annular disc and providing thereon a cylindrical drum surface substantially co-axial with the annular disc, and mounting the drum member on a drive shaft by engaging the annular disc on the drive shaft, thereby to elasticly deform the annular disc about the drive shaft and releasably retain the drum member in substantially co-axial alignment with the drive shaft.

Figure 2:
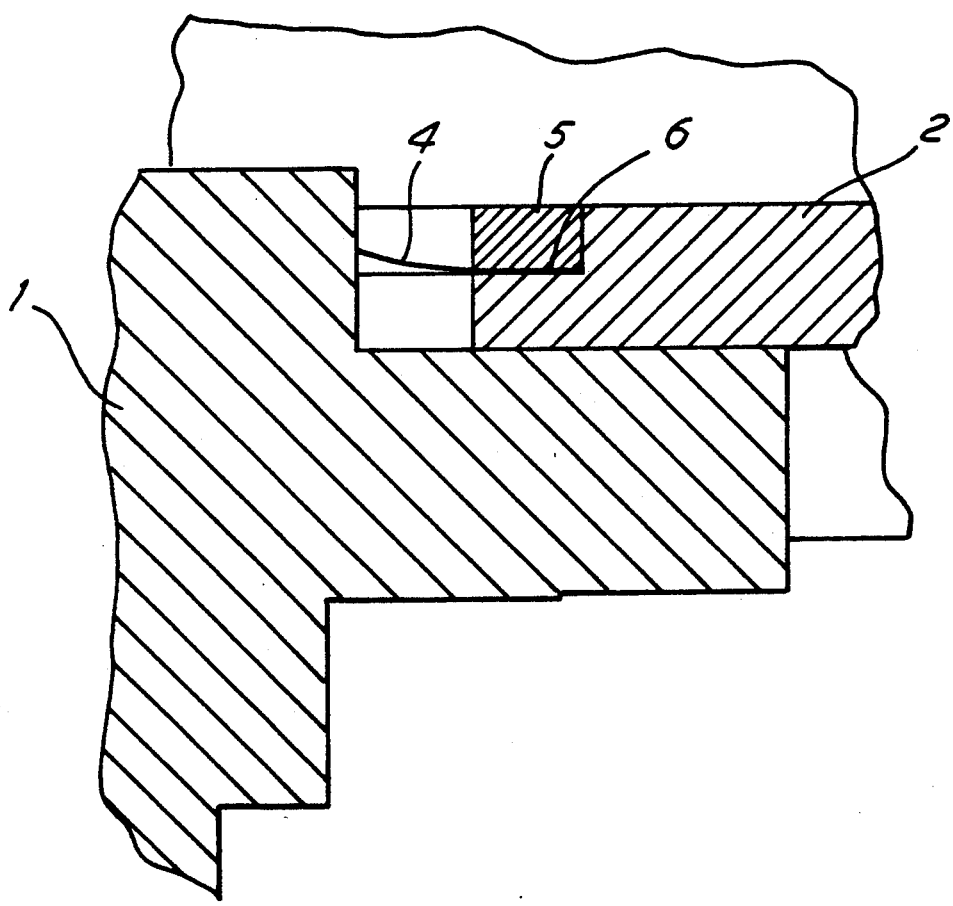

In order that the invention may be clearly understood and readily carried into effect, one embodiment thereof will now be described, by way of example only, with reference to the accompanying drawings, of which:

FIG. 1 shows schematic plan and elevational views of a drum assembly in accordance with one example of the invention, and FIG. 2 shows an enlarged sectional view of part of the drum assembly illustrated in FIG. 1.

FIG. 1 shows a drum assembly for use in a helical scan recording system. The assembly consists of a drive shaft 1 and a scanning element 2. The element 2 usually takes the form of a drum but may be simply the essential recording elements rotating within a stationary drum. The drum 2 and shaft 1 are fixed together in some way, usually, as indicated, by screws such as 3. It is essential that the two components 1 and 2 have their central axes aligned as accurately as possible to minimise radial runout of the assembly. This is achieved in accordance with this example of the invention by the inclusion of a relatively thin annular disc 4 of suitable spring material which is mounted between the shaft 1 and drum 2. The disc 4 is shown in greater detail in FIG. 2, which also shows the provision and location of a retaining ring 5 on a shoulder portion 6 of the drum 2. It is preferable that the spring disc 4 is mounted onto the drum 2 prior to final machining of the drum and bonded into position. The centre hole of the spring disc 4 has a diameter slightly smaller than the corresponding diameter of the mating shaft 1. As, however, the disc 4 is able to deflect, due to its resilience, this allows the centre hole to expand slightly so that it will slide onto and accommodate the mating shaft 1. The disc 4 tends therefore to be deformed uniformly, thus maintaining the drum 2 in a position concentric to the shaft 1. It is still, of course, necessary for the drum 2 to be held orthogonal to the shaft by maintaining the required machining tolerances of the appropriate mating faces, which is relatively easy to achieve.

It can be seen that it is now a relatively simple matter to slide the drum 2 onto the shaft 1 and fix it into a defined position relative to the central axis of the shaft. Furthermore, it is also possible to use the same method of location to position the drum onto a machine mandrel prior to final machining of the drum. The outer surface of the drum 2 can then be machined concentric to the centre hole of the spring disc 4 to the required accuracy. When engaged by the shaft 1, the spring disc positions itself automatically with its centre coinciding with the central axis of the drive shaft 1. Hence, no further adjustment is required to centre the drum 2 on the shaft 1 to the required accuracy.

If it should be necessary to remove the drum without causing damage to the spring disc (e.g. in order to allow disassembly and subsequent reassembly of the drum), this can be readily achieved by sliding the drum 2 along the shaft 1 until an undercut of reduced cross section is reached, allowing the disc to return to its undeformed condition. The drum 2 can now be slid easily from the shaft 1 without damage to the spring disc 4.

In a typical embodiment of the foregoing invention, the shaft is fabricated from stainless steel and has an outside diameter of 10+0/−0.02 mm. For ease of assembly the mating bore normally has dimensions typically 10+0.02/−0 mm. This gives a potential axial mis-alignment of 0.02 mm. Utilising the invention, however, the mating bore is constituted by the inner diameter of the annular spring disc 4. This typically has dimensions as follows: outside diameter; 30+/−0.1 mm, inside diameter; 9.96+0.02/−0 mm. It can be seen that this gives a potential interference between the shaft and disc of 0.04 mm. This degree of interference can easily be accommodated by the spring disc, causing it to deflect axially when pushed onto the shaft 1 by approximately 1 mm from its nominal flat condition. This degree of deflection can be easily accommodated by such a disc manufactured from readily available spring steel material. The stress induced in a disc 0.1 mm thick in this particular example has been calculated using finite element methods as being approximately 40,000 psi which is below the proportional limit for most spring steels.

The axial mis-alignment is now dependent substantially on the circularity of the shaft 1 and inner diameter of the annular spring disc 4. Consequently axial alignment can be maintained to within, say, one or two microns without the need for excessively extreme tolerances on the component parts. It can be seen, therefore, that an order of magnitude improvement can be achieved on the axial alignment of the two drum components by the use of a relatively inexpensive resilient disc.

Using the method of construction described it can be seen that assembly to a high concentricity tolerance can easily be achieved in volume production without the need for tolerances on the appropriate mating diameters having to be exceptionally well maintained. Assembly also becomes very quick and easy. A further advantage is that the drums are also easily interchangeable in the field should servicing of the drum or any of its associated parts become necessary.

What is claimed is:

1. A recording drum assembly comprising a drum member, a drive shaft, and an annular disc of resilient material arranged substantially coaxial with respect to the drum member and having an axial bore for engagement by the drive shaft and arranged to provide substantial axial alignment of the drum member with the drive shaft.

2. An assembly according to claim 1 wherein the drum member includes an axial recess and the annual disc is located within the recess.

3. An assembly according to claim 2 wherein the recess comprises a shoulder portion for accommodating a retaining member for securing the annular disc to the drum member.

4. An assembly according to claim 1 wherein the annular disc comprises spring steel.

5. An assembly according to claim 1 wherein the drive shaft includes a portion of reduced cross section for facilitating removal of the disc from the drive shaft.

6. A method for fabricating a recording drum assembly, the method comprising securing an annular disc of resilient material to a drum member, supporting the drum member by way of the annular disc and providing thereon a cylindrical drum surface substantially co-axial with the annular disc, and mounting the drum member on a drive shaft by engaging the annular disc on the drive shaft, thereby to elasticly deform the annular disc about the drive shaft and releasably retain the drum member in substantially co-axial alignment with the drive shaft.

7. A method according to claim 6 wherein the annular disc is secured in a coaxial recess provided in the drum member.

8. A method according to claim 7 wherein the annular disc is secured in the coaxial recess by a retaining member arranged for location on a shoulder portion of the coaxial recess.

9. A method according to claim 6 comprising providing on the drive shaft a portion of reduced cross section for facilitating subsequent removal of the disc from the drive shaft.

* * * * *